United States Patent
Haglin et al.

(10) Patent No.: US 12,104,733 B2
(45) Date of Patent: Oct. 1, 2024

(54) VDA CONNECTOR ASSEMBLY WITH VERIFICATION

(71) Applicant: DLHBOWLES, INC., Canton, OH (US)

(72) Inventors: Philip Haglin, Ellicott City, MD (US); Jezron Basbas, Nottingham, MD (US); Alan Romack, Columbia, MD (US)

(73) Assignee: DLHBOWLES, INC., Canton, OH (US)

( * ) Notice: Subject to any disclaimer, the term of this patent is extended or adjusted under 35 U.S.C. 154(b) by 42 days.

(21) Appl. No.: 17/888,005

(22) Filed: Aug. 15, 2022

(65) Prior Publication Data

US 2023/0049507 A1 Feb. 16, 2023

Related U.S. Application Data

(60) Provisional application No. 63/232,670, filed on Aug. 13, 2021.

(51) Int. Cl.
*F16L 37/14* (2006.01)
*F16L 37/088* (2006.01)

(52) U.S. Cl.
CPC ......... *F16L 37/144* (2013.01); *F16L 37/0885* (2019.08); *F16L 2201/10* (2013.01); *Y10T 29/49826* (2015.01)

(58) Field of Classification Search
CPC ..... F16L 37/144; F16L 2201/10; F16L 37/14; F16L 37/0885; F16L 37/1225; F16L 37/0841
See application file for complete search history.

(56) References Cited

U.S. PATENT DOCUMENTS

| | | | |
|---|---|---|---|
| 6,082,779 A * | 7/2000 | Lesser | F16L 37/0841 |
| 6,846,021 B2 | 1/2005 | Rohde et al. | |
| 7,390,025 B2 | 6/2008 | Pepe et al. | |
| 7,484,774 B2 | 2/2009 | Kerin et al. | |
| 11,698,156 B2 * | 7/2023 | Kuhn | F16L 37/0885 |
| 2020/0355308 A1 | 11/2020 | Hunt et al. | |
| 2022/0163153 A1 * | 5/2022 | Gauthier | F16L 37/144 |
| 2022/0243850 A1 * | 8/2022 | Teasley | F16L 37/1225 |
| 2022/0299143 A1 * | 9/2022 | Gabbey | F16L 37/144 |
| 2023/0213126 A1 * | 7/2023 | Hartmann | F16L 37/1225 |

* cited by examiner

*Primary Examiner* — William S. Choi
(74) *Attorney, Agent, or Firm* — McDonald Hopkins LLC

(57) ABSTRACT

A connector assembly for joining a male member and a female connector member together to secure fluid communication in a fluid line system. The connector assembly includes a cover that is pivotally attached to the housing to conceal verification indicia when the male member is not attached to the housing. The cover configured to pivot relative to the housing to reveal the indicia once the male member is attached to the housing to allow a user or scanning device to view the indicia to verify a secure attachment of the connector assembly.

18 Claims, 13 Drawing Sheets ial Patent Application No. 63/232,670 filed on Aug.
VDA CONNECTOR ASSEMBLY WITH VERIFICATION

CROSS REFERENCE TO RELATED APPLICATIONS

This application claims priority to and the benefit of U.S. Provisional Patent Application No. 63/232,670 filed on Aug. 13, 2021 and titled, "VDA CONNECTOR ASSEMBLY WITH VERIFICATION" which is incorporated herein in its entirety.

FIELD OF THE INVENTION

This disclosure is generally related to a quick connector assembly for fluid line systems that allow for the secure attachment and detachment of connectable fluid lines. In particular, this disclosure relates to providing a latching configuration with a positive assurance feature that indicates to a user that a quick and secure attachment has been achieved.

BACKGROUND

Quick connector assemblies or couplings generally include a female connector configured to receive and retain a male member to provide a fluid tight connection between two lumens or conduits to establish fluid communication between the two conduits. Quick connector assemblies assist to provide a sealed and secured fluid line with a minimum amount of time, effort, and expense.

Known quick connector assemblies include various configurations for securing the male member and female connector. One type of retention mechanism involves use of a retainer inserted through slots formed in the exterior of the female connector. Support members extend through slots positioned in abutting contact between the male member upset and surfaces defining the slots to prevent withdrawal of the male member. Such retainers are often referred to as "horseshoe" retainers. Examples of this type of coupling are found in U.S. Pat. Nos. 6,846,021, 7,390,025, and 7,484,774. These patents are incorporated by reference herein and disclose a secondary or redundant latch that provides additional security against unintentional separation and to confirm that a secure connection has been achieved during the assembly process.

Other types of quick connector assemblies are known as VDA connector assemblies. VDA stands for "Verband Der Automobilindustrie" which means the "Association of the Automotive Industry" in English which represent manuals and technical publications for quality management in the automotive industry. VDA connector assemblies are typically used in automobiles to assist with connecting tubes in a system for communicating fluids therein, generally within the heating and cooling line systems. VDA connector assemblies usually include a housing that defines a fluid passageway with an opening to receive a male connector member. The housing includes a clip, such as a preformed wire, that can be biased to receive a portion of the male connector member and retain it to the housing and complete the fluid passageway. However, conventional VDA connector assemblies include drawbacks as it is a challenge to identify when a sufficient connection has been achieved. One such attempt at solving this drawback exists in U.S. Published Patent Application No. 2020/0355308 which discloses a QUICK CONNECT ASSEMBLY WITH VERIFICATION TAB. This disclosure relates to a VDA connector assembly that includes a verification tab that is stored within a slot when the assembly is not connected and translates outside of the slot, to be visible to a user, when a connection to a male connector is made.

However, there remain existing drawbacks associated with this and other known VDA connector assemblies such as tolerances associated with various parts that may prevent smooth locking together of the components, adding moving parts may result in failed connections, depressurizations, or leaks. Additionally, solutions that add moving parts may be expensive to manufacture. This disclosure attempts to remedy the known drawbacks associated with VDA connector assemblies.

SUMMARY

In one embodiment, provided is a connector assembly comprising a housing defining a fluid passageway that extends along a central axis that includes a cavity defined in an open first end, the housing including a receiving portion. A clip including opposing legs that are configured to be secured to the housing and at least partially disposed within the cavity, the clip being adapted for releasably engaging and retaining a male connector when inserted into the cavity. A cover may be attached to the receiving portion along the outer surface of the housing, the cover configured to be pivoted between a closed position where the cover is disposed in alignment along the central axis of the housing and an open position where the cover is pivoted away from alignment with the central axis to reveal a portion along an outer surface of the housing. The cover may be adapted to be pivoted when a male connector is received within the cavity.

Further, the male connector may be configured to be received within the cavity wherein the male connector includes a protrusion that is configured to abut against the cover when the male connector is received within the cavity to pivot the cover to the open position. The protrusion may be configured to be received within a complementary shaped inner surface of the cavity in alignment with the receiving portion of the housing. The cover may include a pin and a bias member wherein the pin is attached to the receiving portion to allow the cover to pivot about the pin and the bias member is configured to provide a bias force to pivot the cover towards the closed position. The receiving portion may be along the outer surface of the housing and be placed between the opposing slots and protrude radially from the outer surface. The receiving portion may be aligned with a contoured shape defined along an inner surface of the cavity of the housing, the contoured shape being configured to receive the protrusion from a male connector between the opposing slots. The receiving portion includes a hinge opening to receive and hold the cover along the outer surface of the housing. The receiving portion may be positioned adjacent to a surface having indicia placed thereon. The protrusion of the male connector is configured to extend into the receiving portion such that it protrudes within the hinge opening to abut against the cover.

In one embodiment, the clip includes a main portion wherein the opposing legs extend from opposing sides of the main portion and are generally parallel and aligned along a common plane with one another and wherein the main portion includes a contoured shape that is generally complementary to the shape of the receiving portion along the outer surface of the housing. The clip may be configured to translate between an opened position and a closed position along an axis that is generally normal to the central axis of the housing such that in the open position, a portion of the opposing legs are displaced from within the cavity of the housing and in the closed position, a portion of the opposing legs are positioned within the cavity. At least one stop may be positioned on one of the opposing legs, where the stop is configured to abut against a portion of the outer surface of the housing to prevent further translation of the clip. In an embodiment, the male connector includes an outer surface with an insert portion, an outer radial upset surface, a radial shoulder portion and a protrusion. The radial shoulder portion may be configured to be placed in alignment with the slots of the housing when the insert portion is placed within the cavity of the housing; the radial shoulder portion and the insert portion may have reduced outer radial dimensions than the outer radial upset surface; and the protrusion may be configured to abut against the cover when the insert portion is received within the cavity to pivot the cover to the open position. The receiving portion may include a hinge opening to receive and hold the cover along the outer surface of the housing; the receiving portion may be positioned adjacent to a surface having indicia placed thereon; and the protrusion of the male connector may be configured to extend into the receiving portion such that it protrudes within the hinge opening to abut against the cover and to pivot the cover to the open position to reveal the indicia.

In another embodiment, provided is a method of verifying the connection of fluidic components comprising the step of providing a housing defining a fluid passageway that extends along a central axis that includes a cavity defined in an open first end, the housing including a receiving portion and a cover along with a clip with opposing legs configured to be secured to the housing and be at least partially disposed within the cavity. A male connector having a protrusion may be inserted within the cavity of the housing. The cover may be pivoted from a closed position where the cover is disposed in alignment along the central axis of the housing to an open position where the cover is pivoted away from alignment with the central axis to reveal a portion along an outer surface of the housing. The step of pivoting may include abutting the protrusion against the cover when the male connector is received within the cavity to pivot the cover to the open position. The cover may include a bias member to provide a bias force to pivot the cover towards the closed position. The step of pivoting the cover may include revealing indicia provided along a surface of the housing. The step of inserting the male connector may include extending the protrusion into the receiving portion of the housing such that it protrudes within a hinge opening to abut against the cover.

BRIEF DESCRIPTION OF THE DRAWINGS

The disclosed assembly and method may be better understood by reference to the following detailed description taken in connection with the following illustrations, wherein.

DETAILED DESCRIPTION

Figure 1:
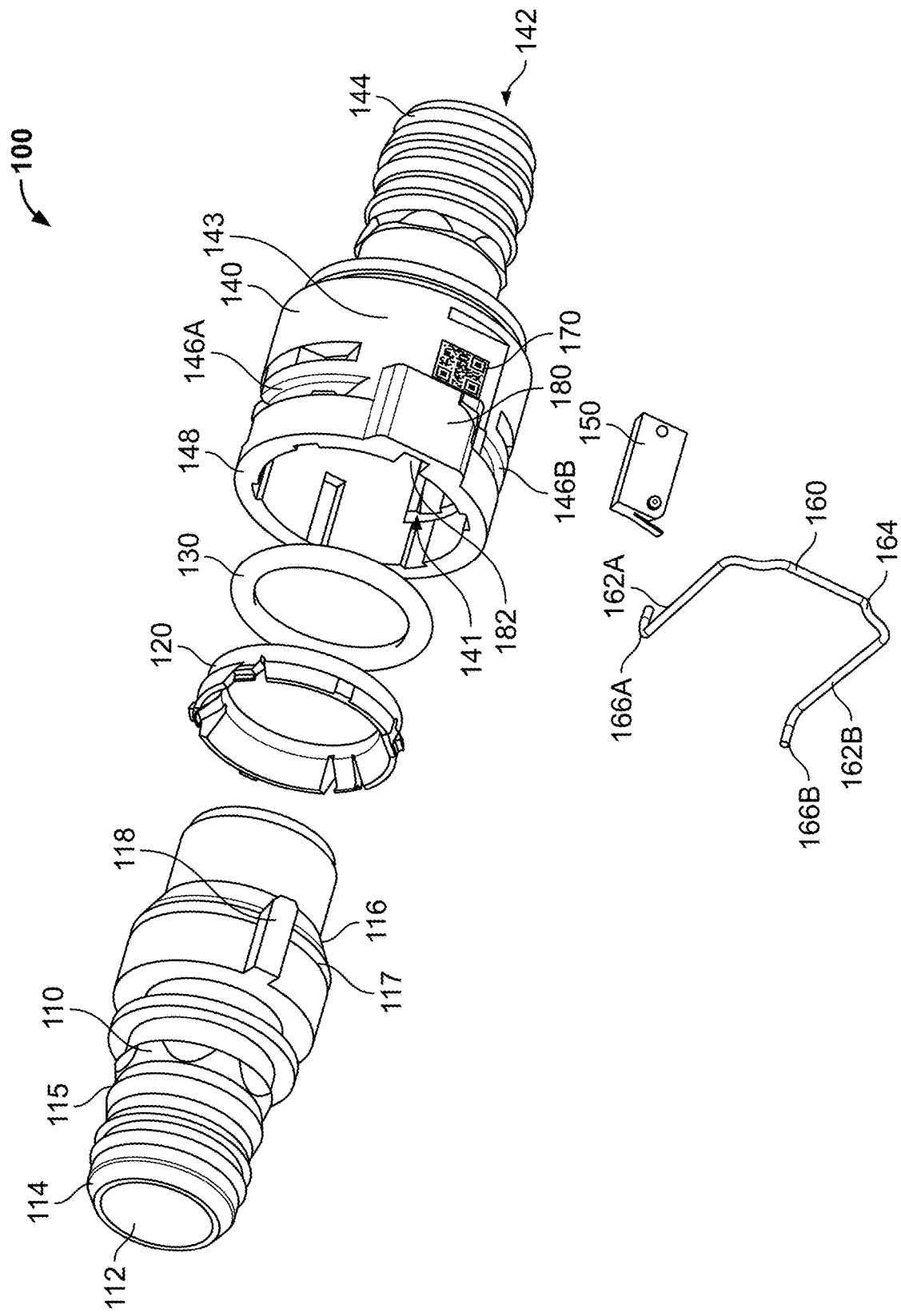
FIG. 1 is an exploded view of an embodiment of the connector assembly in accordance with the present disclosure.

Reference will now be made in detail to exemplary embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the system or assembly may be identical in all of the figures. In the same manner, while a particular aspect of the disclosure is illustrated in these figures, other aspects and arrangements are possible, as will be explained below.

The present disclosure involves embodiments of a connector assembly for use in selectively attaching a male member to a housing within a fluid line system. The assembly includes a housing that is considered a female connector member herein. It is contemplated to establish a secure connection between a rigid tube and other fluid carrying components, particularly a flexible hose. However, the quick connector assembly has numerous other applications where a fluid tight, but releasable connection is desired, such as connection of rigid elements of a fluid path, whether pressurized, or unpressurized. One example is for use in automotive fluid delivery systems. However, the connector assembly may find utility in any environment in which a first fluid line is to be connected to a second fluid line. Such environments include, without limitation, airplanes, locomotives and ships. Other environments include factory, commercial and residential areas. Notably, the term "fluid" herein contemplates liquid, as well as pressurized gas or air.

Figure 2:
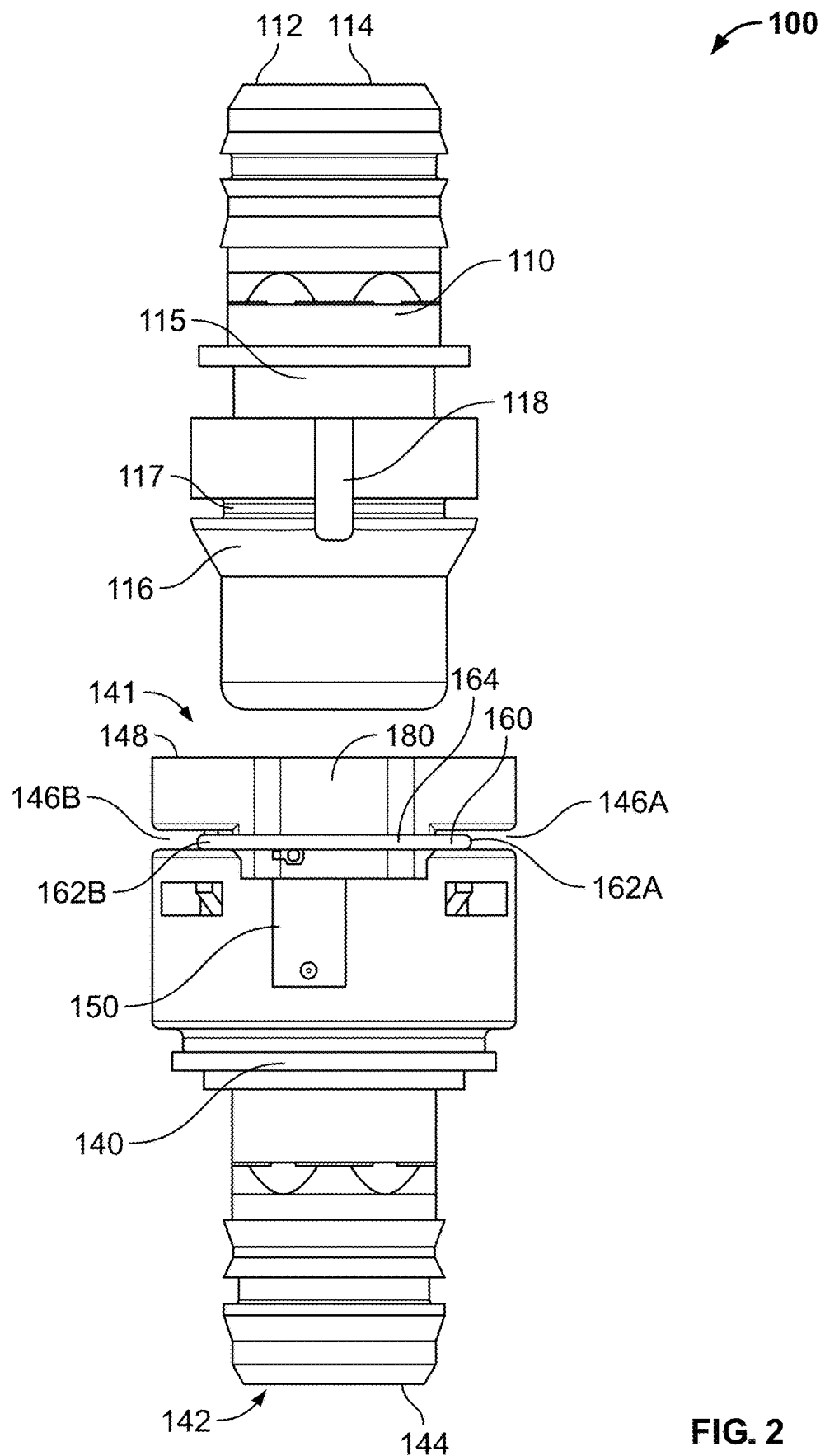
FIG. 2 is a front view of a male connector and housing of the connector assembly in a detached configuration according to the present disclosure.
Figure 3:
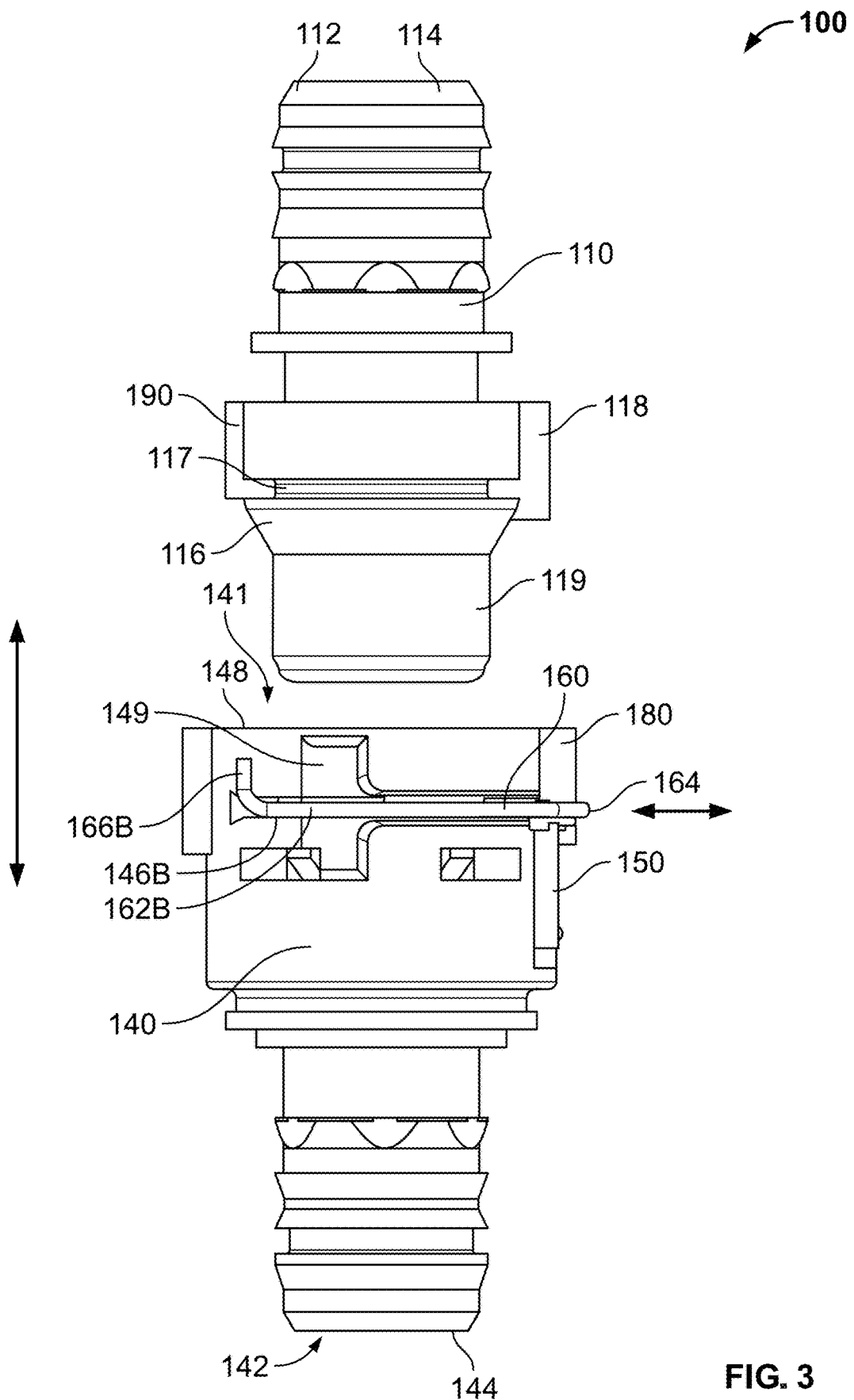
FIG. 3 is a side view of a male connector and housing of the connector assembly in a detached configuration according to the present disclosure.
Figure 4:
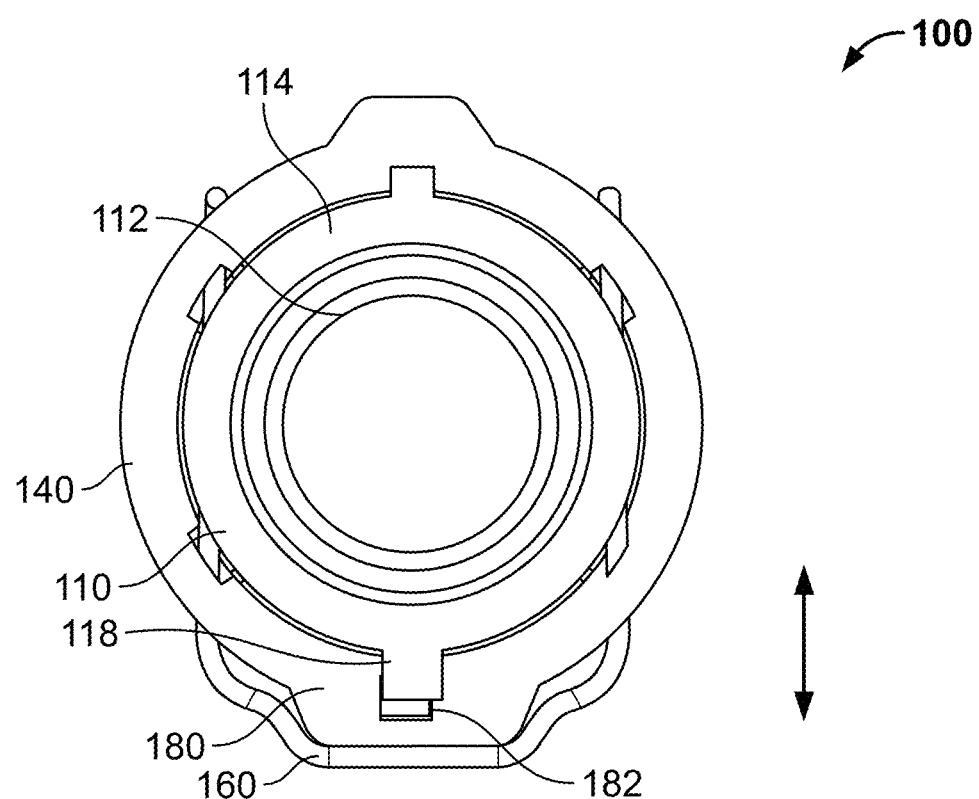
FIG. 4 is a top view of the connector assembly in the detached configuration of FIGS. 2 and 3.
Figure 5:
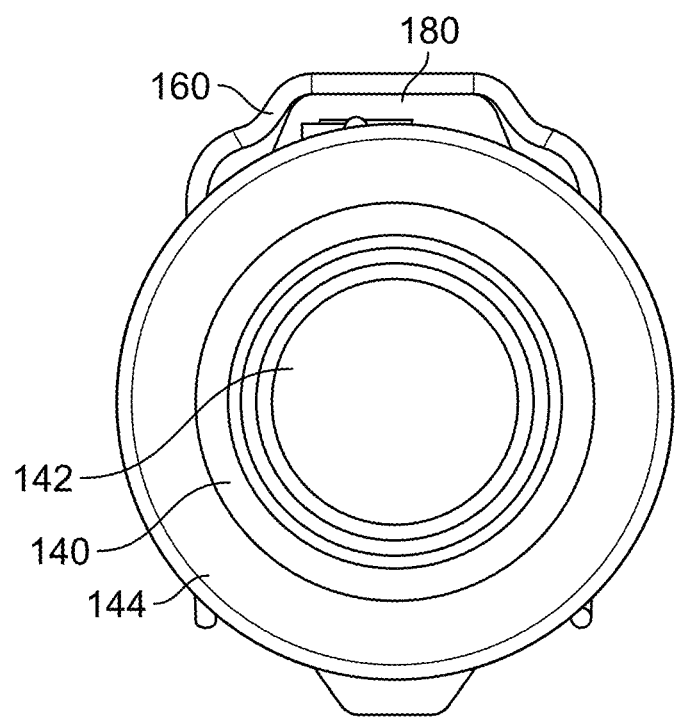
FIG. 5 is a bottom view of the connector assembly in the detached configuration of FIGS. 2 and 3.

The figures provided illustrate exemplary embodiments of an VDA type connector assembly of the instant application. More particularly, FIG. 1 illustrates an exploded embodiment of a connector assembly 100 that may include a male connector 110, an O-ring retention ring 120, an O-ring 130, a connector body or housing 140, a verification cover or shield 150, and a clip 160. FIGS. 2 and 3 further illustrate front and side views the male connector 110 and housing 140 in the detached configuration. FIG. 4 illustrates a top view and FIG. 5 illustrates a bottom view of the assembly while in the detached configuration.

The housing 140 and male connector 110 may each define a fluid passage therein. The male connector 110 is configured to be fit within a cavity 141 defined by a first end 148 of the housing 140 to define a continuous fluid passage. The assembly 100 is configured to communicate fluid from an opening 112 at a first end 114 of the male connector 110 through to an opening 142 along a second end 144 of the housing 140. The male connector 110 may include a contoured shaped outer surface 115 that includes an outer radial upset surface 116, a radial shoulder portion 117, a protrusion 118 and an insert portion 119. These features of the male connector 110 may be shaped in a particular manner that is generally complementary to a shape of the contours within the cavity 141 of the housing 140 as well as the o-ring retention ring 120. Further, the housing 140 may have various configurations including a straight, angled, or 90 degree bend relative to a central axis CA of the housing 140 to be incorporated into various fluid systems. The first end 114 of the male connector 110 and the second end 144 of the housing 140 may each include patterned surface or barbs to assist with connection to separate fluid lines (not shown).

The clip 160 may be made of spring steel or a type of material to form a rigid and deformable wire configuration. However, this disclosure is not limited to the type of material or configuration of the clip as the clip may be any type of polymer or alloy sufficient to function in a manner described herein. The clip 160 may be placed along an outer surface 143 of the housing 140 that includes opposing slots 146A, 146B positioned along opposing sides of the housing 140. The slots 146A, 146B may extend completely through the housing 140 from the outer surface 143 to the cavity 141. The slots may also each include a partially recessed contoured shape 149 that is positioned along the outer surface 143 and aligned to be generally parallel with or adjacent to the central axis CA of the housing 140.

The clip 160 includes a main portion 164 and opposing legs 162A, 162B that extend from side of the main portion 164. The opposing legs are configured to be placed within the opposing slots 146A, 146B of the housing 140. When in the closed position, a portion of the opposing legs 162A, 162B extend through the slots 146A, 146B and into the cavity 141 of the housing 140 wherein the legs are generally parallel or otherwise aligned along a common plane with one another. The main portion 164 may include a contoured shape that is generally complementary to the shape of the outer surface 143 of the housing 140. In particular, the contoured shape of the main portion 164 may be shaped complementary to a receiving portion 180 that is placed between the opposing slots and protrudes from the outer surface 143 along the housing 140. The legs 162A, 162B may each include stops 166A, 166B, respectfully. The stops 166A, 166B may be a protrusion that extends upwardly and/or downwardly relative to a longitudinal length of the legs 162A, 162B or may be a bent portion that is generally angled relative to the longitudinal length of the legs.

Figure 6:
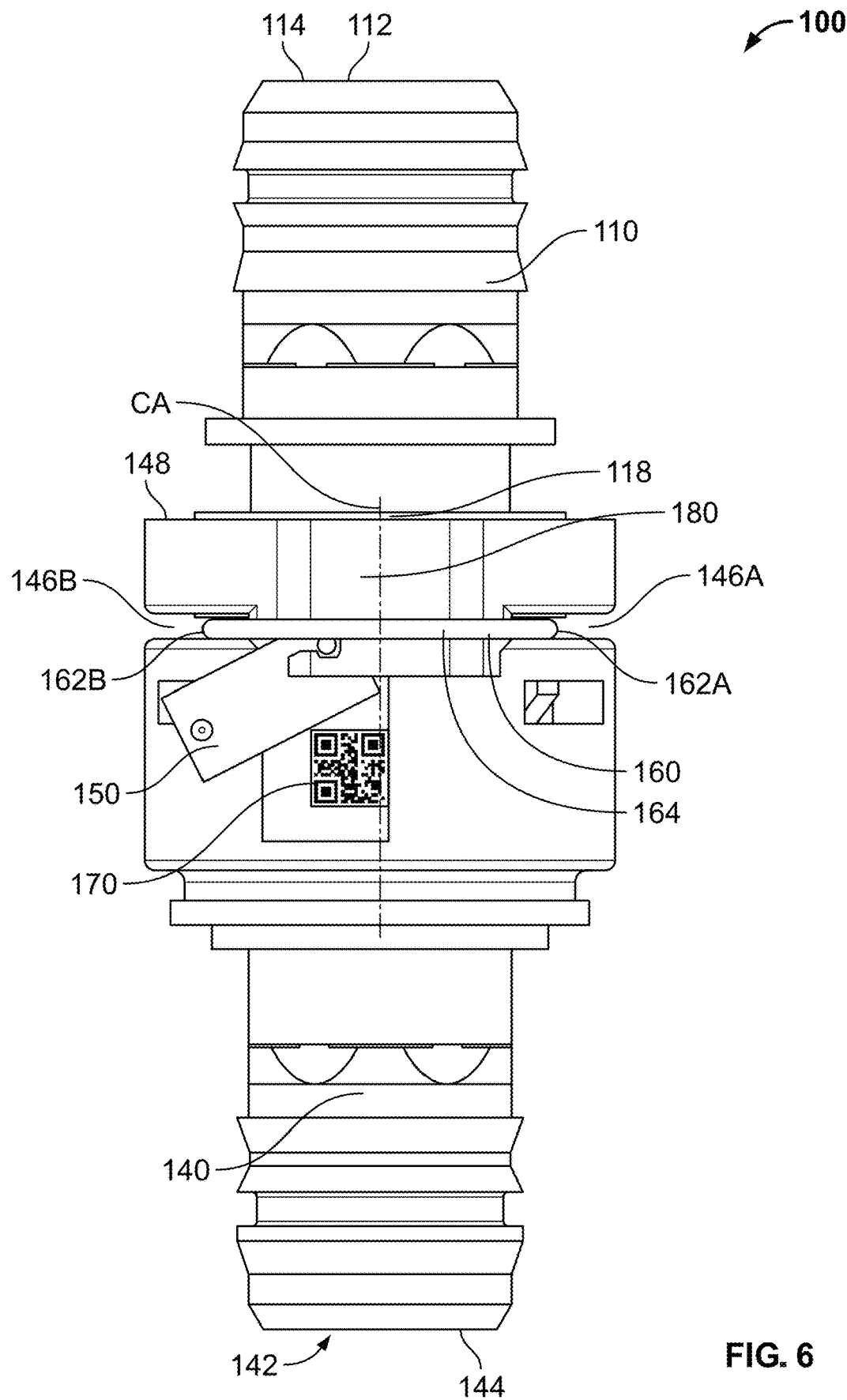
FIG. 6 is a front view of the male connector and the housing of the connector assembly in an attached configuration according to the present disclosure.

In one embodiment, the clip 160 is configured to be translated between an opened position and a closed position along an axis that is generally normal to the central axis CA of the housing 140 (See FIGS. 3 and 6). In the open position (not shown), a portion of the opposing legs 162A, 162B will be displaced from within the cavity 141 of the housing 140. The stops 166A, 166B may abut against the partially recessed contoured shape 149 along the outer surface 143 of the housing 140 to prevent further translation of the clip 160. When in the open position, the outer radial upset surface 116 of the male connector 110 may be received within the cavity 141 and translate passed the legs to allow the radial shoulder portion 117 to be placed in generally alignment with the slots 146A, 146B. Notably, the radial shoulder portion 117 and the insert portion 119 may have a reduced outer radial dimensions than the outer radial upset surface 116 of the male connector 110. Once the insert portion 119 of the male connector 110 is received within the cavity 141 and the radial shoulder portion 117 is aligned with the opposing slots 146A, 146B, the clip 160 may then be translated to the closed position as illustrated by FIGS. 3 and 6. Here, the clip 160 is translated towards the central axis CA of the housing 143 to slide the legs 162A, 162B within the cavity 141 and the radial shoulder portion 117 of the male connector 110 to retain these components in a snug and sealed configuration to allow for fluid communication therebetween.

The O-ring retention ring 120 and O-ring 130 may be placed within the cavity 141 defined by the housing 140 and be configured to receive the insert portion 119 of the male connector 110 when placed within the cavity 141 to assist to make a leak free fluid connection between the housing 140 and the male connector 110.

The connector body 140 may also include indicia 170 placed thereon. The indicia 170 may be placed along the outer surface 143 of the housing 140 and be selectively viewable relative to a pivotal placement of the shield 150. In one embodiment, the indicia 170 is in the form of a QR code but may take other forms including a bar code, letters, numbers, colors, images, patterns, engravings, laser markings, patterned recesses, patterned projections, logos, shapes, or other forms of codes or indicators that can be viewed by a user or a scanning device once exposed. The indicia 170 may be considered verification markings viewable to verify that a sufficient sealed connection is established between the male connector 110 and the housing 140. The indicia 170 may be placed along a generally flat portion of the outer surface 143 of the housing 140 to allow for the pivoting motion of the cover 150 as will be described herein.

Figure 7:
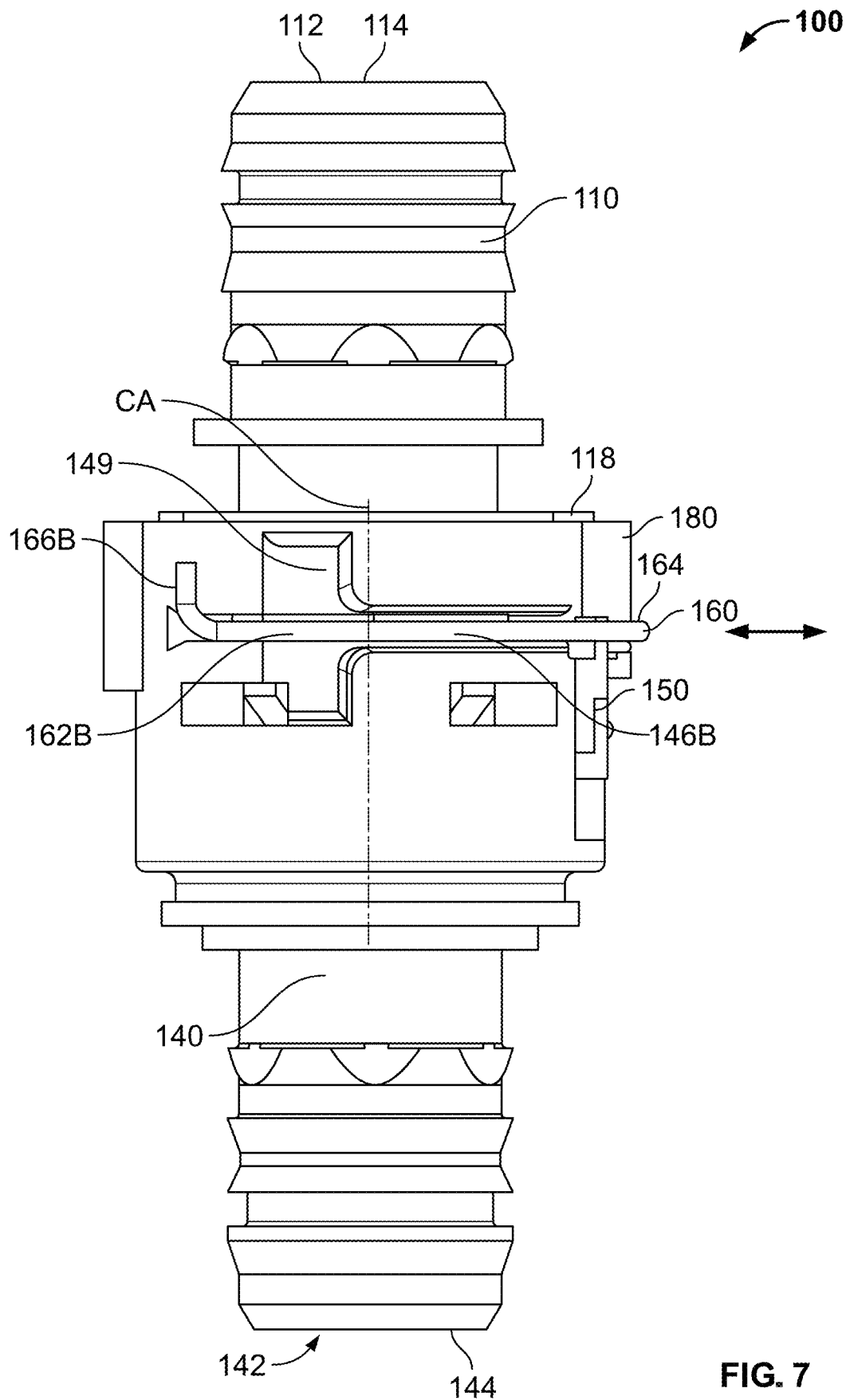
FIG. 7 is a side view of the male connector and the housing of the connector assembly in a attached configuration according to the present disclosure.
Figure 8:
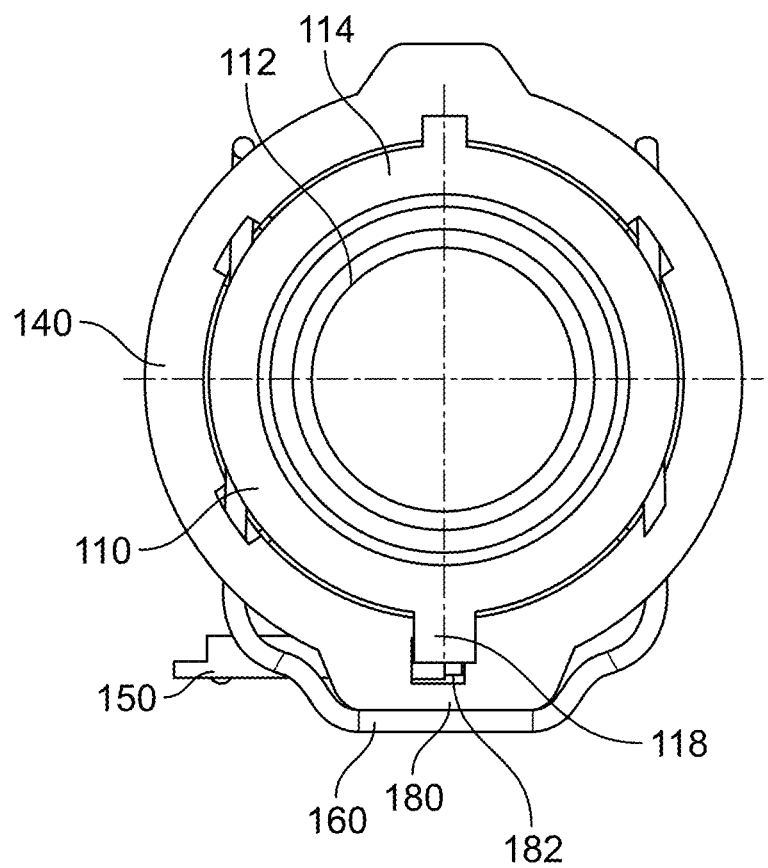
FIG. 8 is a top view of the connector assembly in the attached configuration of FIGS. 6 and 7.
Figure 9:
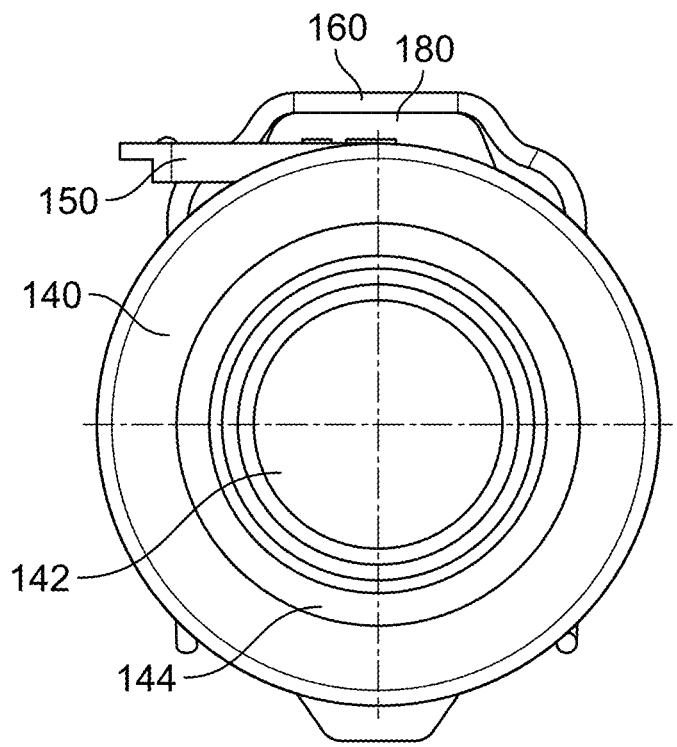
FIG. 9 is a bottom view of the connector assembly in the attached configuration of FIGS. 6 and 7.

FIGS. 6 and 7 further illustrate front and side views of the male connector 110 and housing 140 in the attached configuration. FIG. 8 illustrates a top view and FIG. 9 illustrates a bottom view of the assembly while in the attached configuration. Notably, in these illustrations, the shield 150 is pivoted relative to the central axis CA of the housing 140 thereby allowing the indicia 170 to be viewable therefrom.

As illustrated by FIGS. 2-5, the cover 150 is in the closed position and covers or otherwise conceals the indicia 170 along the outer surface 143 of the housing 140. As illustrated by FIGS. 6-7, the assembly 100 is in the attached configuration and the cover 150 is in the pivoted opened position to uncover or otherwise reveal the indicia 170 along the outer surface 143 of the housing 140.

The cover 150 is configured to pivot relative to the housing 140 once the male connector 110 is inserted into the housing. In this position, the cover 150 is pivoted to be moved away from the indicia 170 such that the indicia 170 is sufficiently viewable to a user or a scanning device. In this manner, the connector assembly 100 may assist a user to verify when an appropriate connection has been made between components of the assembly and that the fluid passageways are in proper communication.

Figure 10:
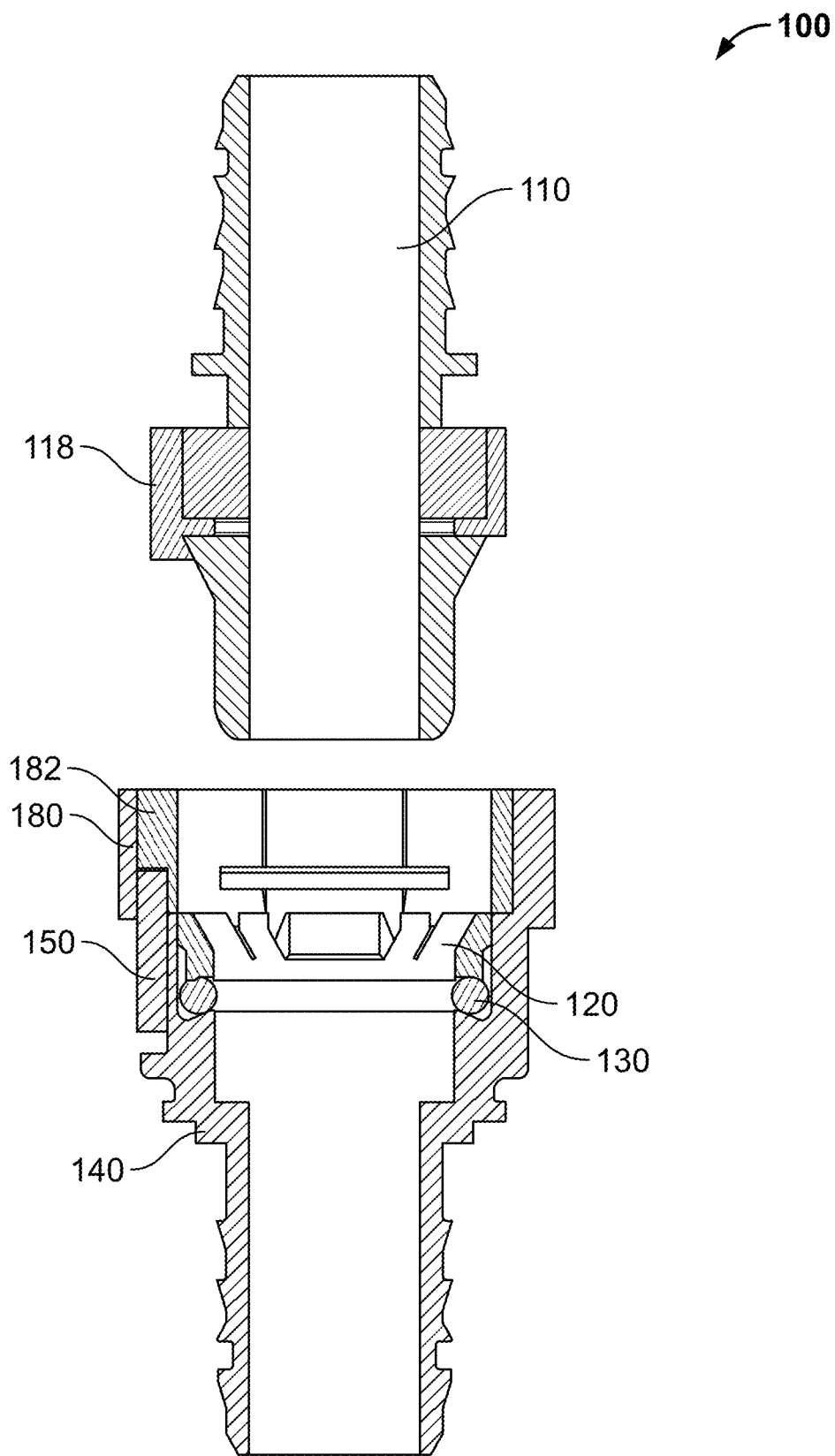
FIG. 10 is a cross sectional side view of the connector assembly in the detached configuration.
Figure 11:
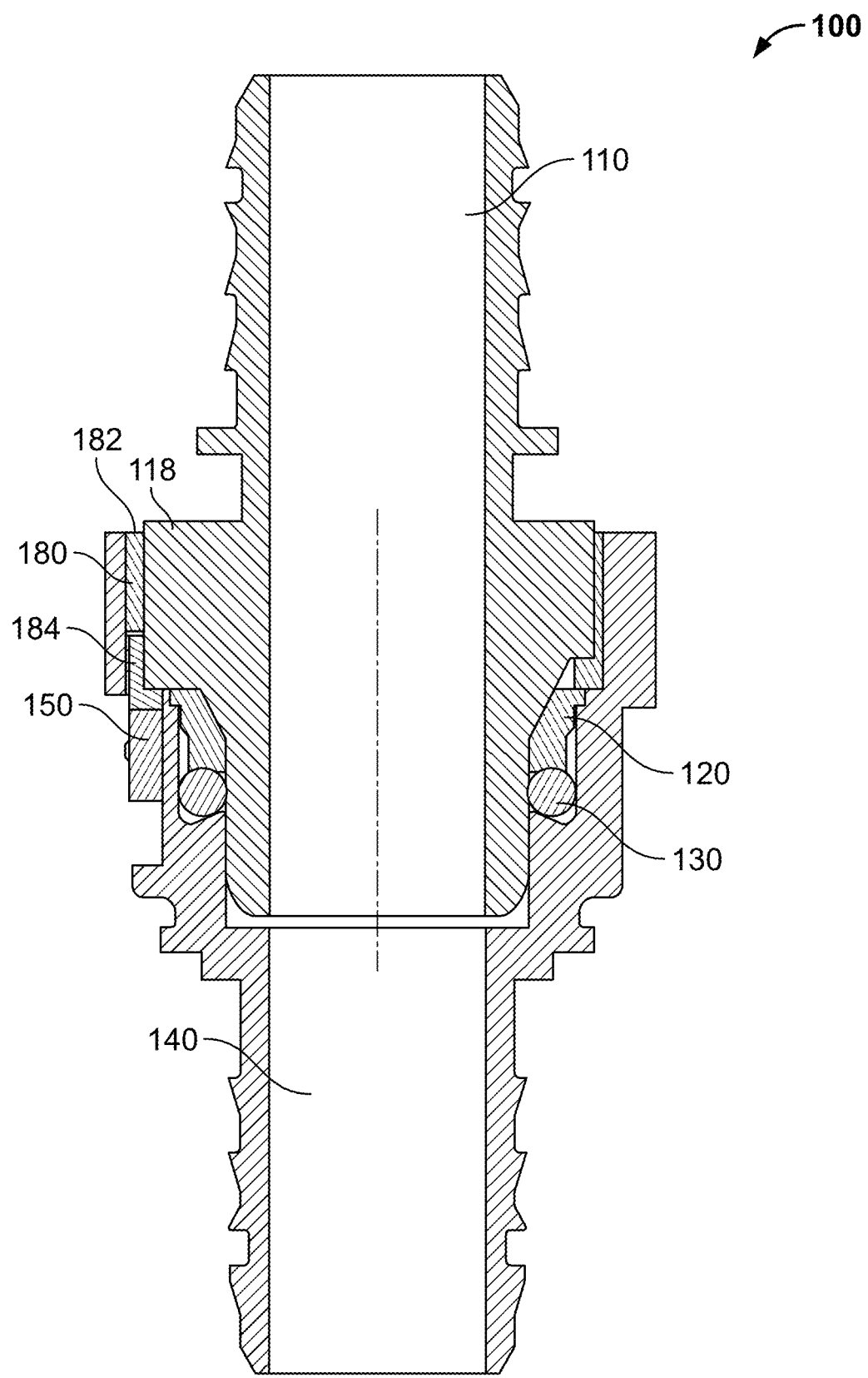
FIG. 11 is a cross sectional side view of the connector assembly in the attached configuration.
Figure 12:
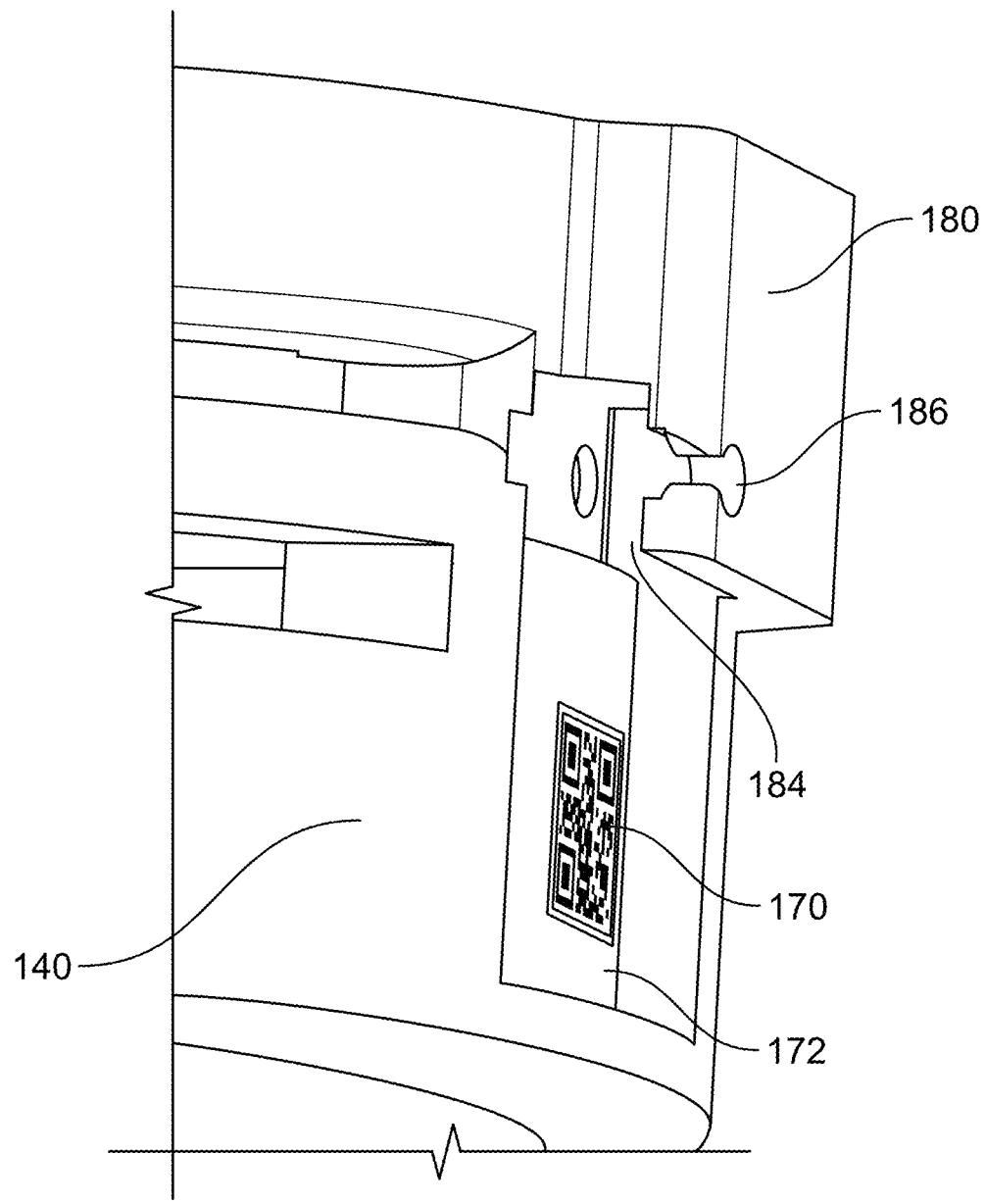
FIG. 12 is an enlarged perspective view of the housing of the connector assembly showing an embodiment of the receiving portion according to the instant disclosure.
Figure 14:
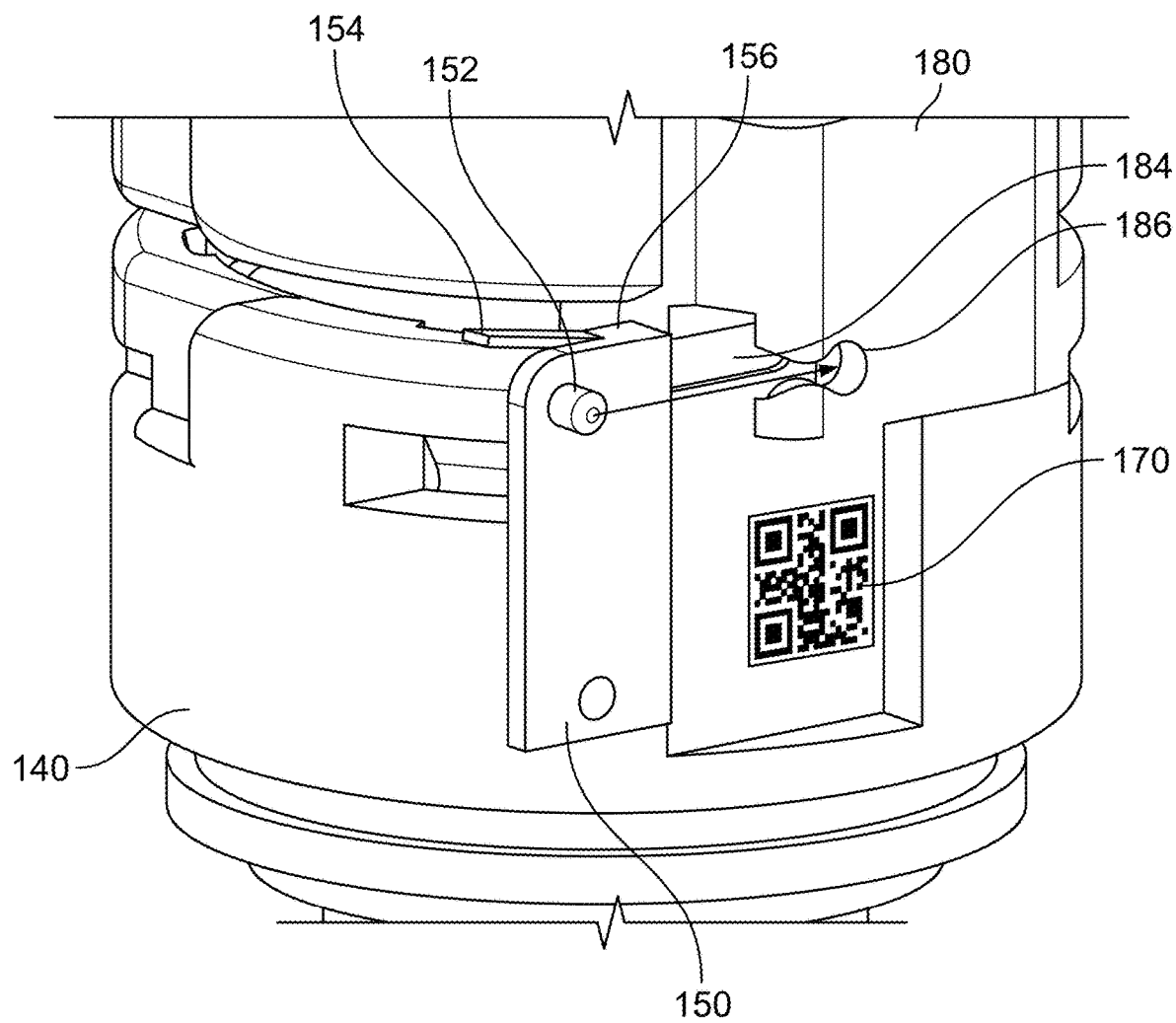
FIG. 14 is an enlarged perspective view of the housing of the connector assembly showing an embodiment of the cover being attached to the receiving portion according to the instant disclosure.

In one embodiment, the protrusion 118 of the male connector 110 may radially extend from an outer surface 115 of the male connector 110. As illustrated by at least the cross sectional views of FIGS. 10 and 11, the protrusion 118 may be configured to be aligned with a contoured shape 182 along an inner surface of the cavity 141 of the housing 140. This contoured shape 182 may be generally aligned along the inner surface of the cavity 141 with the receiving portion 180 along the outer surface 143 of the housing 140. As illustrated by FIGS. 12 and 14, the receiving portion 180 may be positioned adjacent a flat surface 172 having the indicia 170 be shaped to include a hinge opening 184 to receive the cover 150 therein along the outer surface 143 of the housing. Once the male connector 110 is received within the housing 140, the protrusion 118 is also received within the contoured shape 182 and allowed to extend into the receiving portion 118 such that it protrudes within the hinge opening 184 of the receiving portion 180. The protrusion 118 abuts against an abutment surface 156 along an edge of the cover 150 to pivot the cover from a concealing position to a revealing position. The protrusion 118 also acts to prevent the cover 150 from rotating or pivoting back towards the concealing position when the male connector 110 is inserted within the housing 140.

In one embodiment, the protrusion 118 may have an elongated rectangular shape. The male connector 110 may also have an anti-rotation member 190 spaced from the protrusion 118 that extends from its outer surface 115 and can be fitted within a portion of the housing to assist with alignment and preventing rotational movement between the male connector 110 and the housing 140 when attached.

Figure 13A:
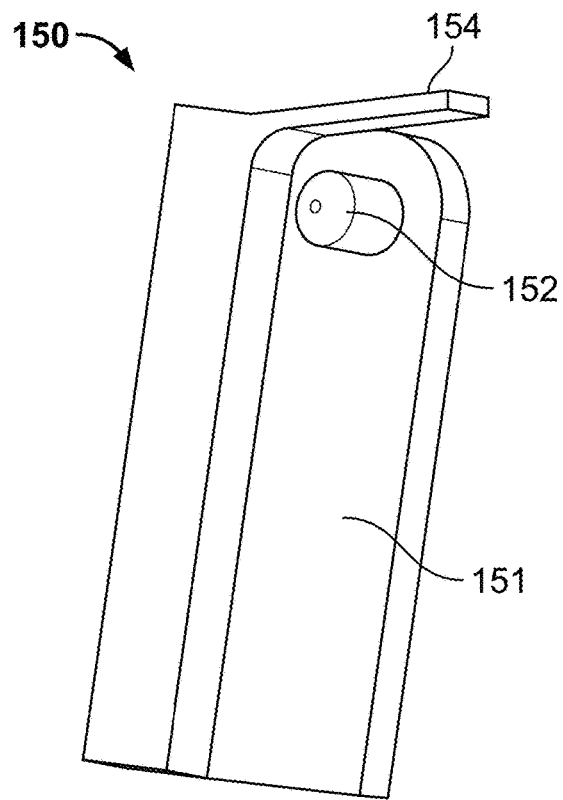
FIG. 13A is a perspective front view of an embodiment of a cover of the connector assembly according to the instant disclosure.
Figure 13B:
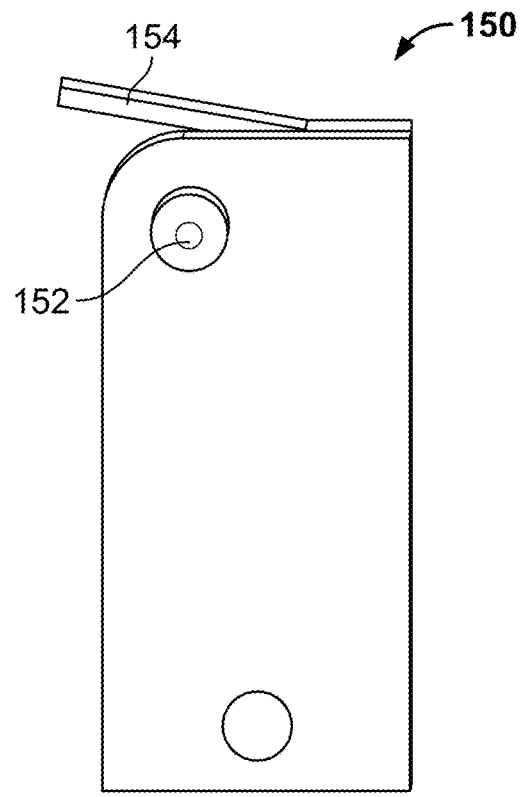
FIG. 13B is a side view of an embodiment of the cover of FIG. 13A.
Figure 13C:
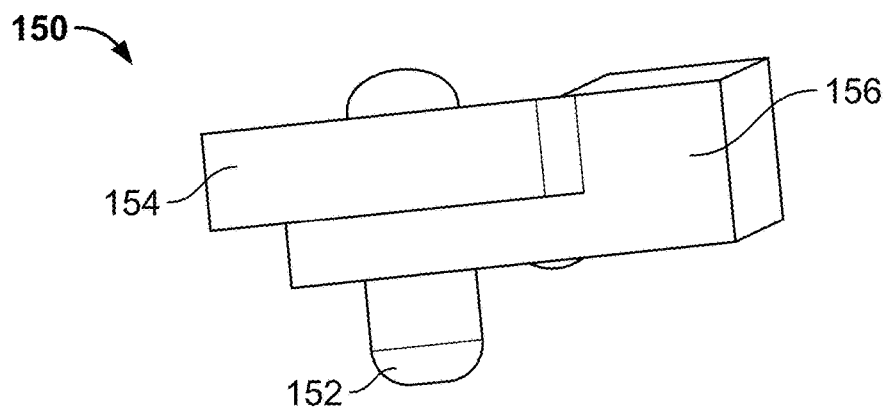
FIG. 13C is a perspective top view of an embodiment of the cover of FIG. 13A.

The cover 150 may be rotatable attached to the housing 140 in a variety of manners. FIGS. 13A, 13B, and 13C illustrate an embodiment of the cover 150. The cover 150 may include a body 151, a pin 152 and a biasing member 154. The pin 152 may extend from or through opposing sides of the cover body 151 and be configured to be received by pivot holes 186 within the receiving portion 180 to allow the cover to be rotatable relative to the hinge opening 184. The biasing member 154 may be in the form of a spring leg that extends from an edge of the cover body 151 at a position adjacent to the abutment surface 156. The biasing member may abut an inner surface or ledge of the housing 140 within the receiving portion 180. The biasing member 154 may assist to provide a bias force towards the conceal position to maintain the cover 150 over the indicia 170 when the male connector 110 is not attached to the housing 140. FIG. 14 illustrates that the pin 152 of the cover 150 may be snap fit within the pivot holes 186 of the receiving portion 180 to allow the cover 150 to conceal the indicia 170 along the outer surface of the housing 140.

Figure 15:
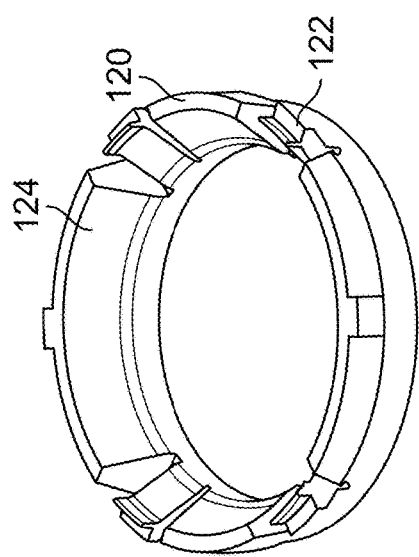
FIG. 15 is a perspective view of an embodiment of the O-ring retention ring.
Figure 16:
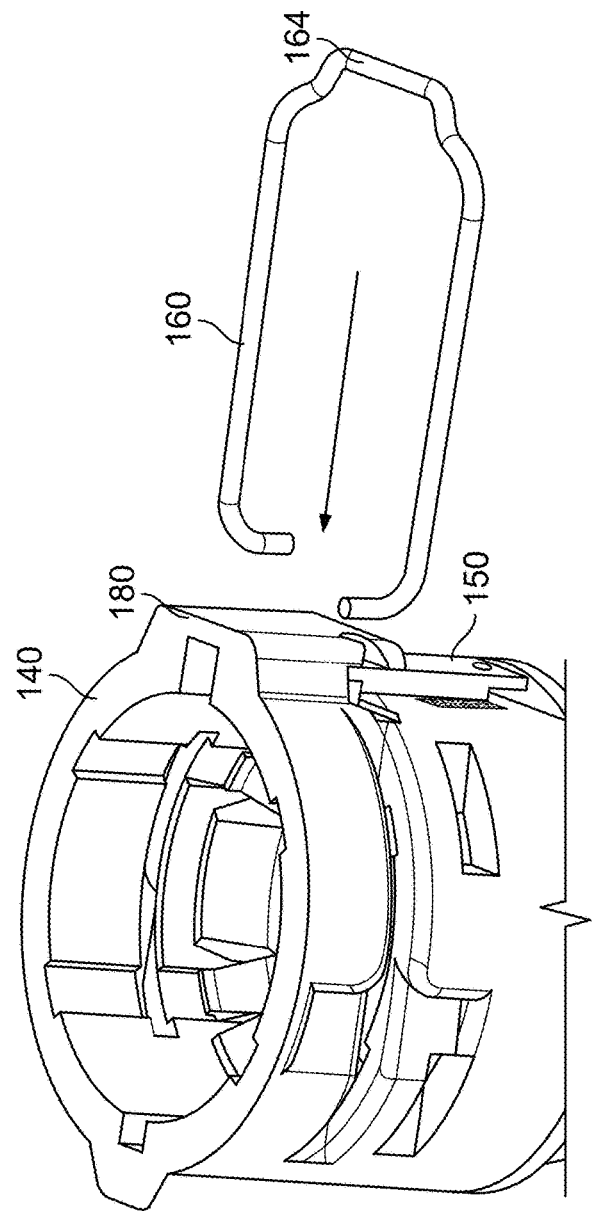
FIG. 16 is a perspective view of an embodiment of the housing separate from a clip according to the instant disclosure.

FIG. 15 illustrates an embodiment of the o-ring retention ring 120 and may include a plurality of radial members 122 configured to be received within a patterned inner surface within the cavity 141 of the housing 140. The o-ring retention ring 120 may include an angled upper surface 124 configured to mate with the upset surface 116 of the male connector 110 while a lower surface abuts against the o-ring 130 positioned within the cavity 141. FIG. 16 illustrates an embodiment of the housing 140 in which the clip 160 is separate from the housing and illustrates how the main portion 164 has a contoured shape that is generally complementary to the receiving portion 180 and the opposing slots 146A, 146B while the legs are aligned in a generally parallel configuration along a common plane.

Although the embodiments of the present disclosure have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A connector assembly comprising:
   a housing defining a fluid passageway that extends along a central axis that includes a cavity defined in an open first end, the housing including a receiving portion;
   a retainer clip including opposing legs that are configured to be secured to the housing and at least partially disposed within the cavity, the retainer clip being adapted for releasably engaging and retaining a male connector when inserted into the cavity;
   a cover attached to the receiving portion along an outer surface of the housing, the cover configured to be pivoted between a closed position where the cover is disposed in alignment along the central axis of the housing and an open position where the cover is pivoted away from alignment with the central axis to reveal a portion along the outer surface of the housing; and
   a pin and a bias member wherein the pin is attached to the receiving portion to allow the cover to pivot about the pin and the bias member is configured to provide a bias force to pivot the cover towards the closed position.

2. The connector assembly of claim 1, wherein cover is adapted to be pivoted when the male connector is received within the cavity.

3. The connector assembly of claim 1, wherein the male connector is configured to be received within the cavity and wherein the male connector includes a protrusion that is configured to abut against the cover when the male connector is received within the cavity to pivot the cover to the open position.

4. The connector assembly of claim 3, wherein the protrusion is configured to be received within a complementary shaped inner surface of the cavity in alignment with the receiving portion of the housing.

5. The connector assembly of claim 1, wherein the clip includes a main portion wherein the opposing legs extend from opposing sides of the main portion and are generally parallel and aligned along a common plane with one another and wherein the main portion includes a contoured shape that is generally complementary to the shape of the receiving portion along the outer surface of the housing.

6. The connector assembly of claim 5, wherein the clip is configured to translate between the opened position and the closed position along an axis that is generally normal to the central axis of the housing such that in the open position, a portion of the opposing legs are displaced from within the cavity of the housing and in the closed position, a portion of the opposing legs are positioned within the cavity.

7. The connector assembly of claim 6, further comprising at least one stop positioned on one of the opposing legs, where the stop is configured to abut against a portion of the outer surface of the housing to prevent further translation of the clip.

8. The connector assembly of claim 1, wherein:
the male connector includes an outer surface with an insert portion, an outer radial upset surface, a radial shoulder portion and a protrusion;
the radial shoulder portion is configured to be placed in alignment with slots in the housing when the insert portion is placed within the cavity of the housing;
the radial shoulder portion and the insert portion each have a reduced outer radial dimensions in comparison to the outer radial upset surface; and
the protrusion is configured to abut against the cover when the insert portion is received within the cavity to pivot the cover to the open position.

9. The connector assembly of claim 8, wherein the receiving portion includes a hinge opening to receive and hold the cover along the outer surface of the housing; wherein the receiving portion is positioned adjacent to a surface having indicia placed thereon; and wherein the protrusion of the male connector is configured to extend into the receiving portion such that the protrusion protrudes within the hinge opening to abut against the cover and to pivot the cover to the open position to reveal the indicia.

10. A connector assembly comprising:
a housing defining a fluid passageway that extends along a central axis that includes a cavity defined in an open first end, the housing including a receiving portion;
a retainer clip including opposing legs that are configured to be secured to the housing and at least partially disposed within the cavity, the retainer clip being adapted for releasably engaging and retaining a male connector when inserted into the cavity;
a cover attached to the receiving portion along an outer surface of the housing, the cover configured to be pivoted between a closed position where the cover is disposed in alignment along the central axis of the housing and an open position where the cover is pivoted away from alignment with the central axis to reveal a portion along the outer surface of the housing; and
wherein the receiving portion along the outer surface of the housing is placed between opposing slots and protrudes radially from the outer surface.

11. The connector assembly of claim 10, wherein the receiving portion is aligned with a contoured shape defined along an inner surface of the cavity of the housing, the contoured shape being configured to receive a protrusion from the male connector between the opposing slots.

12. A connector assembly comprising:
a housing defining a fluid passageway that extends along a central axis that includes a cavity defined in an open first end, the housing including a receiving portion;
a retainer clip including opposing legs that are configured to be secured to the housing and at least partially disposed within the cavity, the retainer clip being adapted for releasably engaging and retaining a male connector when inserted into the cavity;
a cover attached to the receiving portion along an outer surface of the housing, the cover configured to be pivoted between a closed position where the cover is disposed in alignment along the central axis of the housing and an open position where the cover is pivoted away from alignment with the central axis to reveal a portion along the outer surface of the housing; and
wherein the receiving portion includes a hinge opening to receive and hold the cover along the outer surface of the housing.

13. The connector assembly of claim 12, wherein the receiving portion is positioned adjacent to a surface having indicia placed thereon.

14. The connector assembly of claim 13, wherein a protrusion of the male connector is configured to extend into the receiving portion such that the protrusion protrudes within the hinge opening to abut against the cover.

15. A method of verifying the connection of fluidic components comprising:
providing a housing defining a fluid passageway that extends along a central axis that includes a cavity defined in an open first end, the housing including a receiving portion and a cover along with a clip with opposing legs configured to be secured to the housing and be at least partially disposed within the cavity;
inserting a male connector having a protrusion within the cavity of the housing so that the protrusion extends into the receiving portion of the housing and protrudes within a hinge opening to abut against the cover; and
pivoting the cover from a closed position where the cover is disposed in alignment along the central axis of the housing to an open position where the cover is pivoted away from alignment with the central axis to reveal a portion along an outer surface of the housing.

16. The method of claim 15 wherein the step of pivoting includes abutting the protrusion against the cover when the male connector is received within the cavity to pivot the cover to the open position.

17. The method of claim 15 wherein the cover includes a bias member to provide a bias force to pivot the cover towards the closed position.

18. The method of claim 15 wherein the step of pivoting the cover includes revealing indicia provided along a surface of the housing.

* * * * *